United States Patent
Nagahata et al.

(10) Patent No.: US 11,932,758 B2
(45) Date of Patent: Mar. 19, 2024

(54) POLYARYLATE RESIN COMPOSITION AND MOLDED ARTICLE USING THE SAME

(71) Applicant: UNITIKA LTD., Amagasaki (JP)

(72) Inventors: Toshiki Nagahata, Uji (JP); Takatoshi Murakami, Uji (JP)

(73) Assignee: UNITIKA LTD., Amagasaki (JP)

( * ) Notice: Subject to any disclaimer, the term of this patent is extended or adjusted under 35 U.S.C. 154(b) by 230 days.

(21) Appl. No.: 17/424,319

(22) PCT Filed: Feb. 12, 2020

(86) PCT No.: PCT/JP2020/005379
§ 371 (c)(1),
(2) Date: Jul. 20, 2021

(87) PCT Pub. No.: WO2020/175141
PCT Pub. Date: Sep. 3, 2020

(65) Prior Publication Data
US 2022/0073731 A1   Mar. 10, 2022

(30) Foreign Application Priority Data
Feb. 25, 2019   (JP) .................. 2019-032165

(51) Int. Cl.
| | | |
|---|---|---|
| C08L 69/00 | (2006.01) | |
| C08K 5/524 | (2006.01) | |
| C08K 5/526 | (2006.01) | |
| C08K 5/5393 | (2006.01) | |
| C08K 5/5397 | (2006.01) | |
| C08K 5/5419 | (2006.01) | |
| C08L 67/03 | (2006.01) | |

(52) U.S. Cl.
CPC ............ *C08L 67/03* (2013.01); *C08K 5/524* (2013.01); *C08K 5/526* (2013.01); *C08K 5/5393* (2013.01); *C08K 5/5397* (2013.01); *C08K 5/5419* (2013.01); *C08L 69/00* (2013.01); *C08L 2201/08* (2013.01); *C08L 2201/10* (2013.01); *C08L 2203/20* (2013.01)

(58) Field of Classification Search
None
See application file for complete search history.

(56) References Cited

U.S. PATENT DOCUMENTS

| | | |
|---|---|---|
| 5,502,119 A | 3/1996 | Hamilton |
| 2002/0103328 A1 | 8/2002 | Funakoshi et al. |
| 2003/0158309 A1 | 8/2003 | Ono et al. |

FOREIGN PATENT DOCUMENTS

| | | |
|---|---|---|
| CN | 1380896 A | 11/2002 |
| CN | 1408767 A | 4/2003 |
| CN | 101792585 A | 8/2010 |
| JP | 59-65953 A | 4/1984 |
| JP | 2007-119523 A | 5/2007 |
| JP | 2010-163549 A | 7/2010 |
| JP | 2012-82385 A | 4/2012 |
| JP | 2013-194171 A | 9/2013 |
| JP | 2015-21068 A | 2/2015 |

OTHER PUBLICATIONS

ChemBlink data sheet for (3-Acryloxypropyl)trimethoxysilane (2023). (Year: 2023).*
Universal Selector Irgafos 38 technical data sheet (2019) pp. 1-2. (Year: 2019).*
Momentive Performance Materials; Silane Coupling Agents TSL Series (2001) pp. 1-4. (Year: 2001).*
International Preliminary Report on Patentability and Written Opinion of the International Searching Authority for International Application No. PCT/JP2020/005379, dated Aug. 25, 2021.
Chinese Office Action and Search Report for Chinese Application No. 202080013087.X, dated Oct. 8, 2022, with a partial translation.
Japanese Office Action dated Jun. 20, 2023 for Application No. 2021-501890 with an English translation.
Chinese Office Action for Chinese Application No. 202080013087.X, dated Mar. 31, 2023, with an English translation.
Chinese Decision on Rejection dated Jul. 20, 2023 for Application No. 202080013087.X.

* cited by examiner

*Primary Examiner* — David J Buttner
(74) *Attorney, Agent, or Firm* — Birch, Stewart, Kolasch & Birch, LLP

(57) ABSTRACT

The present invention provides a polyarylate resin composition sufficiently excellent in heat resistance, transparency, heat discoloration resistance and moist heat resistance, and a molded article made of the same. The present invention relates to a polyarylate resin composition containing 0.005~5 parts by mass of a silane compound (C) with a boiling point of 200° C. or more, based on 100 parts by mass of the total of a polyarylate resin (A) and a polycarbonate resin (B), a content ratio of the polyarylate resin (A) and the polycarbonate resin (B) being 5/95 to 95/5 (mass ratio).

6 Claims, No Drawings

POLYARYLATE RESIN COMPOSITION AND MOLDED ARTICLE USING THE SAME

TECHNICAL FIELD

The present invention relates to a polyarylate resin composition excellent in heat resistance, transparency, heat discoloration resistance and moist heat resistance, and a molded article made of the same.

BACKGROUND ART

Conventionally, polyarylate resins and polycarbonate resins have been used for lamp covers, lenses and the like for automotive use because they are excellent in heat resistance and transparency. In such uses, it is desired to suppress heat discoloration and improve moist heat resistance during long-term use.

Patent Literature 1 discloses a resin composition containing a polyarylate resin, a polycarbonate resin, a polycarbodiimide compound, and a phosphorus compound. However, the resin composition of Patent Literature 1 had such a problem as moist heat resistance and heat discoloration resistance are insufficient during long-term use.

Patent Literatures 2 and 3 disclose a resin composition containing a polyarylate resin, a polycarbonate resin, a silane compound represented by a specific general formula, and a phosphorus compound. However, the resin compositions of Patent Literatures 2 and 3 also had such a problem as moist heat resistance and heat discoloration resistance are insufficient during long-term use.

CITATIONS LIST

Patent Literatures

Patent Literature 1: JP 2013-194171 A
Patent Literature 2: JP 2010-163549 A
Patent Literature 3: JP 2007-119523 A

SUMMARY OF INVENTION

Technical Problems

An object of the present invention is to provide a polyarylate resin composition more sufficiently excellent in heat resistance, transparency, heat discoloration resistance and moist heat resistance, and a molded article made of the same.

Solutions to Problems

As a result of diligent studies, the present inventors have found that the above object can be attained, and have reached the present invention. That is, the gist of the present invention is as follows.

(1) A polyarylate resin composition; comprising 0.005-5 parts by mass of a silane compound (C) with a boiling point of 200° C. or more, based on 100 parts by mass of the total of a polyarylate resin (A) and a polycarbonate resin (B), a content ratio of the polyarylate resin (A) and the polycarbonate resin (B) being 5/95 to 95/5 (mass ratio).

(2) A polyarylate resin composition as recited in (1), wherein the silane compound (C) is a compound represented by the following general formula (α):

[Chemical 1]
$$[R^1]_{n1} \cdot [R^{21}]_{n2} \cdot [R^{22}]_{4-n1-n2} \cdot Si \quad (\alpha)$$

in which in the general formula (α), $R^1$ is an aryl group; $R^{21}$ is a hydrogen atom or an alkoxy group having the number of carbon atoms 1~10; $R^{22}$ is a hydrogen atom or an alkyl group having the number of carbon atoms 1~10; n1 and n2 are independently an integer of 0 to 4 and the sum of n1 and n2 is an integer of 1 to 4.

(3) A polyarylate resin composition as recited in (1) or (2), further comprising a phosphorus-based compound (D).

(4) A polyarylate resin composition as recited in (3), wherein a content of the phosphorus-based compound (D) is 0.01 to 1 parts by mass based on 100 parts by mass of the total of the polyarylate resin (A) and the polycarbonate resin (B).

(5) A polyarylate resin composition as recited in (3) or (4), wherein the phosphorus-based compound (D) is selected from phosphite compounds, tertiary phosphines, phosphonite compounds.

(6) A molded article, being obtained from the polyarylate resin composition as recited in any one of (1) to (5).

(7) A molded article as recited in (6), wherein the molded article is a lamp peripheral part.

Advantageous Effects of Invention

According to the present invention, it is possible to provide a polyarylate resin composition sufficiently excellent in heat resistance, transparency, heat discoloration resistance and moist heat resistance, and a molded article made of the same.

DESCRIPTION OF EMBODIMENTS

Hereinafter, the present invention will be described in detail.

[Polyarylate Resin Composition]

The polyarylate resin composition of the present invention is a polyarylate resin composition containing a silane compound (C) with a boiling point of 200° C. or more, based on 100 parts by mass of the total of a polyarylate resin (A) and a polycarbonate resin (B). The content ratio of the polyarylate resin (A) and the polycarbonate resin (B) is 5/95 to 95/5 (mass ratio), and from the viewpoint of further improvement of balance between heat resistance and moist heat resistance, it is preferably 10/90 to 90/10 (mass ratio), more preferably 30/70 to 90/10 (mass ratio). In the polyarylate resin composition, when the content ratio of the polyarylate resin (A) is less than 5% by mass, heat resistance and moist heat resistance are poor. When the content ratio exceeds 95% by mass, heat discoloration resistance, moist heat resistance and fluidity become poor.

The content ratio of the polyarylate resin (A) and the polycarbonate resin (B) is preferably 20/80 to 95/5 (mass ratio), more preferably 40/60 to 95/5 (mass ratio), more preferably 60/40 to 93/7 (mass ratio), and further preferably 80/20 to 93/7 (mass ratio), from the viewpoint of further improvement of heat resistance, transparency, heat discoloration resistance, and moist heat resistance.

In the present specification, heat discoloration resistance is a property that discoloration due to heat can be sufficiently suppressed in a molded article using a polyarylate resin composition. In more detail, heat discoloration resistance includes a property that can sufficiently reduce yellow index after heat treatment and a property that can sufficiently reduce difference in yellow index before and after the heat treatment. Therefore, in the molded article using the polyarylate resin composition of the present invention, not only the yellow index after heat treatment but also the difference in yellow index before and after the heat treatment is sufficiently reduced.

Moist heat resistance is a property in which hydrolysis can be sufficiently suppressed in a molded article using a polyarylate resin composition. In more detail, moist heat resistance is a property in which decrease in viscosity can be sufficiently suppressed not only by moist heat treatment under relatively mild conditions but also by moist heat treatment under relatively severe conditions. Therefore, in the molded article using the polyarylate resin composition of the present invention, for example, not only viscosity after moist heat treatment at 130° C. and 75% RH, but also viscosity after moist heat treatment at 140° C. and 75% RH are held high enough.

The polyarylate resin (A) used in the present invention is a polyester comprised of a divalent phenol residue and an aromatic dicarboxylic acid residue.

A compound for introducing a divalent phenol residue may be any organic compound containing two phenolic hydroxyl groups in one molecule. The phenolic hydroxyl group is a hydroxyl group directly bonded to an aromatic ring. Specific examples of raw materials for introducing a divalent phenol residue include 2,2-bis(4-hydroxyphenyl) propane, bis(4-hydroxyphenyl)methane, 1,1-bis(4-hydroxyphenyl)ethane, 2,2-bis(4-hydroxyphenyl)butane, 2,2-bis(4-hydroxyphenyl)-4-methylpentane, 2,2-bis(4-hydroxy-3,5-dimethylphenyl)propane, 2,2-bis(4-hydroxy-3-methylphenyl)propane, 2,2-bis(4-hydroxy-3-isopropylphenyl)propane, 5,5'-(1-methylethylidene)-bis[1,1'-(bisphenyl)-2-ol]propane, butylidenebis(methyl-butylphenol), 2,2-bis(4-hydroxy-3,5-dibromophenyl) propane, 2,2-bis(4-hydroxy-3,5-dichlorophenyl)propane, 2,2-bis(4-hydroxyphenyl)hexafluoropropane, bis(4-hydroxyphenyl)phenylmethane, 1,1-bis(4-hydroxyphenyl)-1-phenylethane, 1,1-bis(4-hydroxyphenyl)-1-phenylpropane, 1,1-bis(4-hydroxyphenyl)-1-phenylbutane, 1,1-bis(4-hydroxy-3-methylphenyl)-1-phenylethane, 1,1-bis(4-hydroxy-3,5-dimethylphenyl)-1-phenylethane, 1,1-bis(4-hydroxyphenyl)-(4-t-butylphenyl)methane, 1,1-bis(4-hydroxy-3,5-dibromophenyl)-1-phenylethane, 1,1-bis(4-hydroxy-3-phenylphenyl)-1-phenylethane, bis(4-hydroxyphenyl) diphenylmethane, 3,3-bis(4-hydroxyphenyl)phthalimidine, N-phenyl-3,3-bis(4-hydroxyphenyl)phthalimidine, N-methyl-3,3-bis(4-hydroxyphenyl)phthalimidine, N-ethyl-3,3-bis(4-hydroxyphenyl)phthalimidine, 9,9-bis(4-hydroxyphenyl)fluorene, 9,9-bis(4-hydroxy-3-methylphenyl)fluorene, 9,9-bis(4-hydroxy-3,5-dimethylphenyl)fluorene, 9,9-bis(4-hydroxy-3-phenylphenyl)fluorene, 1,1-bis(4-hydroxyphenyl)cyclopentane, 1,1-bis(3,5-dimethyl-4-hydroxyphenyl)cyclopentane, 1,1-bis(3-methyl-4-hydroxyphenyl)cyclopentane, 1,1-bis(4-hydroxyphenyl) cyclohexane, 1,1-bis(3,5-dimethyl-4-hydroxyphenyl) cyclohexane, 1,1-bis(3-methyl-4-hydroxyphenyl) cyclohexane, 1,1-bis(4-hydroxyphenyl)-3,3,5-trimethylcyclohexane, 1,1-bis-(4-hydroxyphenyl)-3,3,5,5-tetramethyl-cyclohexane, 1,1-bis-(4-hydroxyphenyl)-3,3,4-trimethyl-cyclohexane, 1,1-bis-(4-hydroxyphenyl)-3,3-dimethyl-5-ethyl-cyclohexane, 1,1-bis-(3,5-dimethyl-4-hydroxyphenyl)-3,3,5-trimethyl-cyclohexane, 1,1-bis-(3,5-diphenyl-4-hydroxyphenyl)-3,3,5-trimethyl-cyclohexane, 1,1-bis-(3-methyl-4-hydroxyphenyl)-3,3,5-trimethyl-cyclohexane, 1,1-bis-(3-phenyl-4-hydroxyphenyl)-3,3,5-trimethyl-cyclohexane, 1,1-bis-(3,5-dichloro-4-hydroxyphenyl)-3,3,5-trimethyl-cyclohexane, 1,1-bis-(3,5-dibromo-4-hydroxyphenyl)-3,3,5-trimethyl-cyclohexane, 1,1-bis(4-hydroxyphenyl)-cycloheptane, 1,1-bis(4-hydroxyphenyl)-cyclooctane, 1,1-bis(4-hydroxyphenyl)-cyclononane, 1,1-bis(4-hydroxyphenyl)-cyclodecane, 1,1-bis(4-hydroxyphenyl)-cycloundecane, 1,1-bis(4-hydroxyphenyl)-cyclododecane, 1,1-bis(4-hydroxyphenyl)-cyclotridecane, 1,4-dihydroxybenzene, 3-t-butyl-1,4-dihydroxybenzene, 1,3-dihydroxybenzene, 3,5-di-t-2,6-dihydroxybenzene, 1,2-dihydroxybenzene, 4-t-butylcatechol, 4,4'-dihydroxybiphenyl, 4,4'-dihydroxy-3,3',5,5'-tetramethylbiphenyl, 4,4'-dihydroxydiphenylmethane, bis(4-hydroxyphenyl)sulfone, bis (4-hydroxyphenyl)sulfide, bis(4-hydroxyphenyl)ether, 1,3-bis(2-(4-hydroxyphenyl)-2-propyl)benzene, 1,4-bis(2-(4-hydroxyphenyl)-2-propyl)benzene, and the like. These compounds may be used alone or in combination of plural kinds.

Among these, it is preferable to use 2,2-bis(4-hydroxyphenyl)propane alone, from the viewpoint of economic efficiency and mechanical properties of a polyarylate resin to be obtained.

A compound for introducing an aromatic dicarboxylic acid residue may be any organic compound containing two carboxyl groups directly bonded to an aromatic ring in one molecule. Specific examples of raw materials for introducing aromatic dicarboxylic acid residues include terephthalic acid, isophthalic acid, orthophthalic acid, 4,4'-diphenyldicarboxylic acid, diphenyl ether-2,2'-dicarboxylic acid, diphenyl ether-2,3'-dicarboxylic acid, diphenyl ether-2,4'-dicarboxylic acid, diphenyl ether-3,3'-dicarboxylic acid, diphenyl ether-3,4'-dicarboxylic acid, diphenyl ether-4,4'-dicarboxylic acid, and 2,6-naphthalenedicarboxylic acid. These compounds may be used alone or in combination of plural kinds.

As the polyarylate resin (A), it is preferable to use terephthalic acid and isophthalic acid in combination, from the viewpoint of melt processing properties and mechanical properties. The blending ratio of terephthalic acid and isophthalic acid can be arbitrarily selected, but it is preferably 20/80 to 80/20, more preferably 30/70 to 70/30, and further preferably 40/60 to 60/40 by molar ratio, from the viewpoint of polymerizable properties, melt processing properties, and mechanical properties.

The polyarylate resin (A) of the present invention may contain residues of other components such as aliphatic diols, alicyclic diols, aliphatic dicarboxylic acids and alicyclic dicarboxylic acids, in addition to the divalent phenol residue and the aromatic dicarboxylic acid residue, as long as effects of the present invention are not impaired. Examples of the aliphatic diol include ethylene glycol and propylene glycol. Examples of the alicyclic diol include 1,4-cyclohexanediol, 1,3-cyclohexanediol, and 1,2-cyclohexanediol. Examples of the aliphatic dicarboxylic acid include adipic acid and sebacic acid. Examples of the alicyclic dicarboxylic acid include 1,4-cyclohexanedicarboxylic acid, 1,3-cyclohexanedicarboxylic acid, and 1,2-cyclohexanedicarboxylic acid. The residues of other components are preferably contained in an amount of less than 10 mol % with respect to the total number of moles of the raw material monomer, and more preferably substantially not contained.

The method for producing the polyarylate resin (A) is not particularly limited, and those obtained by known methods such as an interface polymerization method, a melt polymerization method, and a solution polymerization method can be used. Among them, a polyarylate resin obtained by an interfacial polymerization method is preferable from the viewpoint of color tone and molecular weight control.

In the present invention, two or more kinds of polyarylate resins may be used in combination as the polyarylate resin (A).

The polyarylate resin (A) has an inherent viscosity of preferably 0.4 to 0.8 and more preferably 0.4 to 0.7, from the viewpoint of heat resistance, mechanical properties, and fluidity. Inherent viscosity can be measured using 1,1,2,2-tetrachloroethane as a solvent, using an Ubbelohde viscometer, at the temperature of 25° C.

The polycarbonate resin (B) used in the present invention is a polycarbonate ester comprised of a divalent phenol residue and a carbonate residue.

A compound for introducing a divalent phenol residue may be any organic compound containing two phenolic hydroxyl groups in one molecule. The phenolic hydroxyl group is a hydroxyl group directly bonded to an aromatic ring. Specific examples of raw materials for introducing a divalent phenol residue include 2,2-bis(4-hydroxyphenyl) propane, bis(4-hydroxyphenyl)methane, 1,1-bis(4-hydroxyphenyl)ethane, 2,2-bis(4-hydroxyphenyl)butane, 2,2-bis(4-hydroxyphenyl)-4-methylpentane, 2,2-bis(4-hydroxy-3,5-dimethylphenyl)propane, 2,2-bis(4-hydroxy-3-methylphenyl)propane, 2,2-bis(4-hydroxy-3-isopropylphenyl)propane, 5,5'-(1-methylethylidene)-bis[1,1'-(bisphenyl)-2-ol]propane, butylidenebis(methyl-butylphenol), 2,2-bis(4-hydroxy-3,5-dibromophenyl)propane, 2,2-bis(4-hydroxy-3,5-dichlorophenyl)propane, 2,2-bis(4-hydroxyphenyl)hexafluoropropane, bis(4-hydroxyphenyl)phenylmethane, 1,1-bis(4-hydroxyphenyl)-1-phenylethane, 1,1-bis(4-hydroxyphenyl)-1-phenylpropane, 1,1-bis(4-hydroxyphenyl)-1-phenylbutane, 1,1-bis(4-hydroxy-3-methylphenyl)-1-phenylethane, 1,1-bis(4-hydroxy-3,5-dimethylphenyl)-1-phenylethane, 1,1-bis(4-hydroxyphenyl)-(4-t-butylphenyl)methane, 1,1-bis(4-hydroxy-3,5-dibromophenyl)-1-phenylethane, 1,1-bis(4-hydroxy-3-phenylphenyl)-1-phenylethane, bis(4-hydroxyphenyl)diphenylmethane, 3,3-bis(4-hydroxyphenyl)phthalimidine, N-phenyl-3,3-bis(4-hydroxyphenyl)phthalimidine, N-methyl-3,3-bis(4-hydroxyphenyl)phthalimidine, N-ethyl-3,3-bis(4-hydroxyphenyl)phthalimidine, 9,9-bis(4-hydroxyphenyl)fluorene, 9,9-bis(4-hydroxy-3-methylphenyl)fluorene, 9,9-bis(4-hydroxy-3,5-dimethylphenyl)fluorene, 9,9-bis(4-hydroxy-3-phenylphenyl)fluorene, 1,1-bis(4-hydroxyphenyl)cyclopentane, 1,1-bis(3,5-dimethyl-4-hydroxyphenyl)cyclopentane, 1,1-bis(3-methyl-4-hydroxyphenyl)cyclopentane, 1,1-bis(4-hydroxyphenyl)cyclohexane, 1,1-bis(3,5-dimethyl-4-hydroxyphenyl)cyclohexane, 1,1-bis(3-methyl-4-hydroxyphenyl)cyclohexane, 1,1-bis(4-hydroxyphenyl)-3,3,5-trimethylcyclohexane, 1,1-bis-(4-hydroxyphenyl)-3,3,5,5-tetramethyl-cyclohexane, 1,1-bis-(4-hydroxyphenyl)-3,3,4-trimethyl-cyclohexane, 1,1-bis-(4-hydroxyphenyl)-3,3-dimethyl-5-ethyl-cyclohexane, 1,1-bis-(3,5-dimethyl-4-hydroxyphenyl)-3,3,5-trimethyl-cyclohexane, 1,1-bis-(3,5-diphenyl-4-hydroxyphenyl)-3,3,5-trimethyl-cyclohexane, 1,1-bis-(3-methyl-4-hydroxyphenyl)-3,3,5-trimethyl-cyclohexane, 1,1-bis-(3-phenyl-4-hydroxyphenyl)-3,3,5-trimethyl-cyclohexane, 1,1-bis-(3,5-dichloro-4-hydroxyphenyl)-3,3,5-trimethyl-cyclohexane, 1,1-bis-(3,5-dibromo-4-hydroxyphenyl)-3,3,5-trimethyl-cyclohexane, 1,1-bis(4-hydroxyphenyl)-cycloheptane, 1,1-bis(4-hydroxyphenyl)-cyclooctane, 1,1-bis(4-hydroxyphenyl)-cyclononane, 1,1-bis(4-hydroxyphenyl)-cyclodecane, 1,1-bis(4-hydroxyphenyl)-cycloundecane, 1,1-bis(4-hydroxyphenyl)-cyclododecane, 1,1-bis(4-hydroxyphenyl)-cyclotridecane, 1,4-dihydroxybenzene, 3-t-butyl-1,4-dihydroxybenzene, 1,3-dihydroxybenzene, 3,5-di-t-2,6-dihydroxybenzene, 1,2-dihydroxybenzene, 4-t-butylcatechol, 4,4'-dihydroxybiphenyl, 4,4'-dihydroxy-3,3',5,5'-tetramethylbiphenyl, 4,4'-dihydroxydiphenylmethane, bis(4-hydroxyphenyl)sulfone, bis(4-hydroxyphenyl)sulfide, bis(4-hydroxyphenyl)ether, 1,3-bis(2-(4-hydroxyphenyl)-2-propyl)benzene, 1,4-bis(2-(4-hydroxyphenyl)-2-propyl)benzene, and the like. These compounds may be used alone or in combination of plural kinds.

As the polycarbonate resin (B), it is preferable to use 2,2-bis(4-hydroxyphenyl)propane alone, from the viewpoint of economic efficiency and mechanical properties.

Specific examples of the raw material for introducing a carbonate residue include carbonyl halides such as phosgene and carbonic acid esters such as diphenyl carbonate.

The method for producing the polycarbonate resin (B) is not particularly limited, and those obtained by known methods such as an interface polymerization method and a melt polymerization method can be used.

In the present invention, two or more kinds of polycarbonate resins may be used in combination as the polycarbonate resin (B).

The polycarbonate resin (B) has an inherent viscosity of preferably 0.3 to 0.8 and more preferably 0.3 to 0.7, from the viewpoint of heat resistance, mechanical properties, and fluidity. Inherent viscosity can be measured using 1,1,2,2-tetrachloroethane as a solvent, using an Ubbelohde viscometer, at the temperature of 25° C.

The type of the silane compound (C) used in the present invention is not limited as long as it has a boiling point of 200° C. or more, and it is possible to sufficiently enhance heat discoloration resistance and moist heat resistance of a polyarylate resin composition to be obtained. Further, the boiling point of the silane compound (C) is preferably 210° C. or more, more preferably 220° C. or more, and more preferably 250° C. or more, from the viewpoint of further improvement of balance between heat discoloration resistance and moist heat resistance. The boiling point of the silane compound (C) is usually 400° C. or less, and from the viewpoint of further improvement of heat discoloration resistance and moist heat resistance, it is preferably 360° C. or less and more preferably less than 320° C. In a process of producing a polyarylate resin composition by using a silane compound with a high boiling point, or in a process of obtaining a molded article using the polyarylate resin composition, compatibility and dispersibility of the contained silane compound in the polyarylate resin composition are improved, and volatilization from the polyarylate resin composition is suppressed. Therefore, the polyarylate resin composition excellent in heat discoloration resistance and moist heat resistance can be obtained. When the boiling point of the silane compound is less than 200° C., heat discoloration resistance and moist heat resistance are lowered.

As the silane compound (C), for example, a silane compound having a predetermined boiling point represented by general formula (α) can be used.

[Chemical 2]

$$[R^1]_{n1} \cdot [R^{21}]_{n2} \cdot [R^{22}]_{4-n1-n2} \cdot Si \qquad (\alpha)$$

In the general formula (α), $R^1$ is an aryl group. Examples of the aryl group include a phenyl group, a naphthyl group, and the like. Preferred $R^1$ is a phenyl group. When the general formula (α) has a plurality of $R^1$s, the plurality of $R^1$s may be independently selected from the above groups.

$R^{21}$ is a hydrogen atom or an alkoxy group. The number of carbon atoms of the alkoxy group is usually 1 to 10, preferably 1 to 7, more preferably 1 to 5, and further preferably 1 to 3. The alkoxy group may be linear or branched chain, and is preferably linear. Specific examples of the alkoxy group include a methoxy group, an ethoxy group, a propoxy group, a butoxy group, a pentyloxy group, a hexyloxy group, a heptyloxy group, and the like. Preferred $R^1$ is an alkoxy group, and particularly an alkoxy group having 1 to 7 carbon atoms. When the general formula (α) has a plurality of $R^{21}$s, the plurality of $R^{21}$s may be independently selected from the above groups.

$R^{22}$ is a hydrogen atom or an alkyl group. The number of carbon atoms of the alkyl group is usually 1 to 10, preferably 1 to 7, more preferably 1 to 5, and further preferably 1 to 3. The alkyl group may be linear or branched chain, and is preferably linear. Specific examples of the alkyl group include a methyl group, an ethyl group, a propyl group, a butyl group, a pentyl group, a hexyl group, a heptyl group, and the like. Preferred $R^{22}$ is an alkyl group, and particularly an alkyl group having 1 to 7 carbon atoms. When the general formula (α) has a plurality of $R^{22}$s, the plurality of $R^{22}$s may be independently selected from the above groups.

n1 and n2 are independently an integer of 0 to 4, preferably 1 to 4, and more preferably 1 to 3. However, the sum of n1 and n2 is an integer of 1 to 4, preferably 3 or 4, and more preferably 4.

The silane compound (C) represented by the general formula (α) specifically includes silane compounds represented by general formulas (α-i), (α-ii) and (α-iii):
[Chemical 3]

$$[R^1]_{n1} \cdot [R^{21}]_{n2} \cdot Si \quad (\alpha\text{-i})$$

In the general formula (α-i), $R^1$ and $R^{21}$ are the same as the $R^1$ and $R^{21}$ in the general formula (α) described above, respectively. Preferred $R^1$ and $R^{21}$ in the general formula (α-i) are the same as the preferred $R^1$ and $R^{21}$ in the general formula (α) described above, respectively.

n1 and n2 are independently an integer of 0 to 4, preferably 1 to 4, and more preferably 1 to 3. However, the sum of n1 and n2 is 4. In a more preferred embodiment, n1 is an integer of 1 to 3 and particularly 1 or 2, and n2 is an integer of 1 to 3 and particularly 2 or 3.

Specific examples of the silane compound of the general formula (α-i) include dimethoxydiphenylsilane (boiling point 304° C.), phenyltrimethoxysilane (boiling point 218° C.), phenyltriethoxysilane (boiling point 236° C.), diethoxydiphenylsilane (boiling point 299° C.), ethoxytriphenylsilane (boiling point 344° C.), and the like.
[Chemical 4]

$$[R^1]_{n1} \cdot [R^{22}]_{4-n1} \cdot Si \quad (\alpha\text{-ii})$$

In the general formula (α-ii), $R^1$ and $R^{22}$ are the same as the $R^1$ and $R^{22}$ in the general formula (α) described above, respectively. Preferred $R^1$ and $R^{22}$ in the general formula (α-ii) are the same as the preferred $R^1$ and $R^{22}$ in the general formula (α) described above, respectively.

n1 is an integer of 0 to 4, preferably 1 to 4, more preferably 1 to 3, further preferably 2 or 3, and particularly preferably 3.

Specific examples of the silane compound of the general formula (α-ii) include methyltriphenylsilane (boiling point 349° C.) and the like.
[Chemical 5]

$$[R^{21}]_{n2} \cdot [R^{22}]_{4-n2} \cdot Si \quad (\alpha\text{-iii})$$

In the general formula (α-iii), $R^{21}$ and $R^{22}$ are the same as the $R^{21}$ and $R^{22}$ in the general formula (α) described above, respectively. Preferred $R^{21}$ and $R^{22}$ in the general formula (α-iii) are the same as the preferred $R^{21}$ and $R^{22}$ in the general formula (α) described above, respectively.

n2 is an integer of 0 to 4, preferably 1 to 3, more preferably 2 or 3, and further preferably 3.

Specific examples of the silane compound of the general formula (α-iii) include hexyltrimethoxysilane (boiling point 202° C.) and the like.

In the present invention, as the silane compound (C), it is preferable to use the silane compounds having a predetermined boiling point represented by the general formulas (α-i) and (α-ii) among the compounds described above, from the viewpoint of further improvement of heat resistance, transparency, heat discoloration resistance, and moist heat resistance.

Among the silane compounds having a predetermined boiling point represented by the general formulas (α-i) and (α-ii), silane compounds represented by the following general formula (I) can be particularly preferably used in that effects of heat discoloration resistance and moist heat resistance are high.
[Chemical 6]

$$[R^1]_n \cdot [R^2]_{4-n} \cdot Si \quad (I)$$

In the general formula (I), $R^1$ is the same as the $R^1$ in the general formula (α) described above. Preferred $R^1$ in the general formula (I) is the same as the preferred $R^1$ in the general formula (α) described above. When the general formula (I) has a plurality of $R^1$s, the plurality of R's may be independently selected from the above groups.

In the general formula (I), RY represents any of a hydrogen atom, an alkyl group, or an alkoxy group. When the general formula (I) has a plurality of $R^2$s, the plurality of $R^2$s may be independently selected from the above groups.

The alkyl group as $R^2$ is the same as the alkyl group as $R^{22}$ in the general formula (α) described above. Preferred alkyl group as $R^2$ is the same as the preferred alkyl group as $R^{22}$ in the general formula (α) described above.

The alkoxy group as $R^2$ is the same as the alkoxy group as $R^{21}$ in the general formula (α) described above. Preferred alkoxy group as $R^2$ is the same as the preferred alkoxy group as $R^{21}$ in the general formula (α) described above.

Preferred $R^2$ represents either an alkyl group or an alkoxy group.

More preferred $R^2$ is a linear or branched chain alkyl group having 1 to 7, preferably 1 to 5 and more preferably 1 to 3 carbon atoms, or a linear or branched alkoxy groups having 1 to 7, preferably 1 to 5 and more preferably 1 to 3 carbon atoms.

n is an integer of 1 to 4, preferably 1 to 3, more preferably 1 or 2, and further preferably 2.

As commercially available products of the silane compound (C), dimethoxydiphenylsilane (KBM-202SS made by Shin-Etsu Chemical Co., Ltd.), phenyltrimethoxysilane (KBM-103 made by Shin-Etsu Chemical Co., Ltd.), phenyltriethoxysilane (KBE-103 made by Shin-Etsu Chemical Co., Ltd.), hexyltrimethoxysilane (KBM-3063 made by Shin-Etsu Chemical Co., Ltd.) and the like can be used.

The content of the silane compound (C) with a boiling point of 200° C. or more is 0.005 to 5 parts by mass based on 100 parts by mass of the total of the polyarylate resin (A) and the polycarbonate resin (B), and from the viewpoint of further improvement of heat resistance, transparency, heat discoloration resistance and moist heat resistance, it is preferably 0.02 to 3 parts by mass, more preferably 0.02 to 1 part by mass, and more preferably 0.03 to 0.5 parts by mass. When the content of the silane compound (C) with a boiling point of 200° C. or more is less than 0.005 parts by mass, effects of heat discoloration resistance and moist heat resistance are poor. When the content exceeds 5 parts by mass, heat discoloration resistance and moist heat resistance are lowered, and heat resistance tends to be lowered. Two or more kinds of the silane compounds (C) can be also mixed and used, and in that case, the total content thereof may be within the above ranges.

The polyarylate resin composition of the present invention may further contain a phosphorus-based compound (D). The phosphorus-based compound (D) is not particularly limited, and for example, one or more kinds of compounds selected from phosphite compounds, tertiary phosphines, phosphonite compounds and the like can be used. As the phosphorus-based compound, a phosphite compound and a tertiary phosphine are preferable, and a phosphite compound is particularly preferable, from the viewpoint of further improvement of heat discoloration resistance and moist heat resistance of a polyarylate resin composition to be obtained.

For example, heat discoloration resistance of the polyarylate resin composition is sufficiently improved practically by using the silane compound, but it is possible to synergistically improve heat discoloration resistance by containing one or more kinds of compounds selected from phosphite compounds and tertiary phosphines (especially phosphite compounds).

Further, for example, moist heat resistance of the polyarylate resin composition is sufficiently improved practically by using the silane compound, but it is possible to synergistically improve moist heat resistance (especially moist heat resistance under relatively severe conditions) by containing a phosphite compound (preferably, a phosphite compound with a phosphorus atom content of 10% or less, particularly 6.0% or less). Specifically, in the present invention, in order to further and sufficiently exhibit an effect of improving moist heat resistance, it is desirable to use a phosphite compound with a phosphorus atom content of 10% or less, particularly 6% or less, among the phosphite compounds, in combination with the silane compound (C). Details of a phenomenon, in which moist heat resistance (especially moist heat resistance under relatively severe conditions) is synergistically improved by using a phosphite compound with a phosphorus atom content of 10% or less, particularly 6% or less, are not clear, but are considered to be based on the following mechanism. By using a phosphite compound with a phosphorus atom content of 10% or less, particularly 6% or less, it is possible to sufficiently reduce the concentration of phosphoric acid produced when using a phosphorus-based compound (especially a phosphite compound) by decomposition of the compound. Therefore, it is possible to further sufficiently suppress hydrolysis of the polyarylate resin and the polycarbonate resin by the phosphoric acid. The phosphorus atom content in a phosphite compound with a phosphorus atom content of 10% or less, particularly 6% or less, is usually 1% or more, particularly 2% or more. The phosphorus atom content is a mass ratio of phosphorus atomic weight to a molecular weight of the phosphorus-based compound.

Examples of the phosphite compound that can be used in the present invention include tris(nonylphenyl)phosphite (phosphorus atom content 9.0%), triphenylphosphite (phosphorus atom content 10.0%), isodecyldiphenylphosphite (phosphorus atom content 8.3%), 2-ethylhexyldiphenylphosphite (phosphorus atom content 9.0%), tris(2,4-di-t-butylphenyl)phosphite (phosphorus atom content 4.8%), 2,2'-methylenebis(4,6-di-t-butylphenyl) 2-ethylhexylphosphite (phosphorus atom content 5.3%), bis(nonylphenyl) pentaerythritol diphosphite (phosphorus atom content 9.8%), distearyl pentaerythritol diphosphite (phosphorus atom content 8.5%), bis(2,4-di-t-butylphenyl)pentaerythritol diphosphite (phosphorus atom content 10.2%), bis[2,4-di(1-phenylisopropyl)phenyl]pentaerythritol diphosphite (phosphorus atom content 7.3%), bis(2,6-di-t-butyl-4-methylphenyl)pentaerythritol diphosphite (phosphorus atom content 9.8%), 1,1,3-tris(2-methyl-4-ditridecylphosphite-5-t-butylphenyl)butane (phosphorus atom content 5.1%), and the like.

Examples of the tertiary phosphine include triethylphosphine, tripropylphosphine, tributylphosphine, trioctylphosphine, triamylphosphine, dimethylphenylphosphine, dibutylphenylphosphine, diphenylmethylphosphine, diphenyloctylphosphine, triphenylphosphine, tri-p-trilphosphine, trinaphthylphosphine, diphenylbenzylphosphine, and the like.

Examples of the phosphonite compound include tetrakis(2,4-di-t-butylphenyl) 4,4'-biphenylene-di-phosphonite and tetrakis(2,4-di-t-butyl-5-methylphenyl) 4,4'-biphenylene-di-phosphonite.

The phosphorus-based compound can be used alone, but two or more kinds of compounds can be used in combination. For example, two or more kinds of phosphite compounds, two or more kinds of tertiary phosphines or two or more kinds of phosphonite compounds can be used in combination, or a phosphite compound and a tertiary phosphine can be used in combination.

Among specific examples of the phosphorus-based compound, as the phosphorus-based compound, a compound of Embodiment 1 below is preferably used, a compound of Embodiment 2 below is more preferably used, and a compound of Embodiment 3 below is further preferably used, from the viewpoint of further improvement of heat discoloration resistance and moist heat resistance:

Embodiment 1: One or more kinds of compounds selected from phosphite compounds (for example, tris(2,4-di-t-butylphenyl)phosphite, bis(2,6-di-t-butyl-4-methylphenyl) pentaerythritol diphosphite) and tertiary phosphines (for example, triphenylphosphine);

Embodiment 2: One or more kinds of compounds selected from phosphite compounds (preferably phosphite compounds with a phosphorus atom content of 10% or less, particularly 6% or less);

Embodiment 3: One or more kinds of compounds selected from tris(2,4-di-t-butylphenyl)phosphite and bis(2,6-di-t-butyl-4-methylphenyl)pentaerythritol diphosphite.

The content of the phosphorus-based compound (D) is preferably 0.01 to 1 parts by mass, more preferably 0.02 to 0.50 parts by mass, further preferably 0.02 to 0.20 parts by mass, and particularly preferably 0.025 to 0.075 parts by mass based on 100 parts by mass of the total of the polyarylate resin (A) and the polycarbonate resin (B), from the viewpoint of further improvement of transparency, heat discoloration resistance, and moist heat resistance. When two or more kinds of the phosphorus-based compounds (D) are mixed and used, the total content thereof may be within the above ranges.

[Method for Producing Polyarylate Resin Composition]

The method for producing the polyarylate resin composition of the present invention will be described.

The method for producing the polyarylate resin composition of the present invention is not particularly limited, and any method can be selected. Examples of the method for producing the polyarylate resin composition include a method of mixing a polyarylate resin polymer and a polycarbonate resin polymer by means such as melt-kneading (hereinafter referred to as a melt-kneading method), and a method of obtaining a copolymer after mixing monomer components constituting a polyarylate resin and monomer components constituting a polycarbonate resin (hereinafter referred to as a polymerization method). When the melt-kneading method is adopted, the silane compound (C) with a boiling point of 200° C. or more can be contained by adding it to the polyarylate resin (A) and the polycarbonate resin (B) before kneading, or it can be contained by adding it to the polyarylate resin (A) and the polycarbonate resin (B) in another step after kneading, for example, by adding it directly at the time of further kneading or molding. When the polymerization method is adopted, the silane compound (C) can be contained in the copolymer by adding it before polymerization, or it can also be added to the copolymer obtained by the polymerization method and contained by the melt-kneading method. It is also possible to carry out the above methods in combination. The phosphorus-based compound (D) and other components described below can also be contained by the above means, by the same method as the method for adding and containing the silane compound (C). The method for adding and containing the phosphorus-based compound (D) may be selected independently of the method for adding and containing the silane compound (C). The resin composition of the present invention may have a so-called pellet form.

The polyarylate resin composition of the present invention can also contain other components (for example, various additives such as antioxidants other than phosphorus-based compounds, mold release agents, flame retardants and inorganic fillers; and/or polyester resins other than polyarylate resins or polycarbonate resins) as long as its properties are not impaired.

Examples of the antioxidants other than the phosphorus-based compounds include hindered phenol compounds and thioether compounds.

Specific examples of the hindered phenolic compound include 1,3,5-tris(3,5-di-t-butyl-4-hydroxybenzyl) isocyanurate, 1,1,3-tri(4-hydroxy-2-methyl-5-t-butylphenyl)butane, 1,1-bis(3-t-butyl-6-methyl-4-hydroxyphenyl)butane, 3,5-bis(1,1-dimethylethyl)-4-hydroxy-benzenepropanoic acid, pentaerythrityl tetrakis(3,5-di-t-butyl-4-hydroxyphenyl) propionate, 3-(1,1-dimethylethyl)-4-hydroxy-5-methyl-benzenepropanoic acid, 3,9-bis[1,1-dimethyl-2-[(3-t-butyl-4-hydroxy-5-methylphenyl)propionyloxy]ethyl]-2,4,8,10-tetraoxaspiro[5.5]undecane, 1,3,5-trimethyl-2,4,6-tris(3',5'-di-t-butyl-4'-hydroxybenzyl)benzene, and the like.

Specific examples of the thioether compounds include 4,4'-thiobis[2-t-butyl-5-methylphenol]bis[3-(dodecylthio) propionate], thiobis[2-(1,1-dimethylethyl)-5-methyl-4,1-phenylene]bis[3-(tetradecylthio)-propionate], pentaerythritol tetrakis(3-n-dodecylthiopropionate), and bis(tridecyl) thiodipropionate. These antioxidants may be used alone or in combination of two or more kinds.

The mold release agent is not particularly limited, and various fatty acid esters and the like can be used. Among them, dipentaerythritol fatty acid ester, fatty acid ester of aliphatic monoalcohol and the like can be preferably used. Examples of the dipentaerythritol fatty acid ester include dipentaerythritol hexalaurate, dipentaerythritol hexamyristate, dipentaerythritol hexapalmitate, dipentaerythritol hexastearate, dipentaerythritol hexabehenate, dipentaerythritol adipic stearate, dipentaerythritol adipic stearate oligomer, and the like. Examples of the fatty acid ester of aliphatic monoalcohol include behenyl behenate, behenyl stearate, stearyl stearate, stearyl behenate, and the like. The mold release agents may be used alone or in combination of two or more kinds.

Examples of the flame retardant include halogen-based flame retardants and non-halogen-based flame retardants, but non-halogen-based flame retardants are preferable from the viewpoint of environmental impact. Examples of the flame retardant include phosphorus-based flame retardants, nitrogen-based flame retardants, silicone-based flame retardants, and the like. The flame retardants may be used alone or in combination of two or more kinds.

Examples of the inorganic filler include silica, glass, alumina, talc, mica, barium sulfate, aluminum hydroxide, magnesium hydroxide, calcium carbonate, magnesium carbonate, magnesium oxide, titanium oxide, silicon nitride, boron nitride, and the like. The inorganic fillers may be used alone or in combination of two or more kinds. Further, the inorganic filler is preferably surface-treated with a surface treatment agent such as an epoxy silane coupling agent or an amino silane coupling agent.

Examples of the polyester resin other than the polyarylate resin or the polycarbonate resin include a polyethylene terephthalate resin, a polycyclohexanedimethylene terephthalate resin, a polyester resin obtained by copolymerizing polycyclohexanedimethylene terephthalate with isophthalic acid, and the like. Such polyester resins may be used alone or in combination of two or more kinds.

[Molded Article and its Production Method]

The polyarylate resin composition of the present invention can be used for producing various molded articles requiring heat resistance and transparency.

The polyarylate resin composition of the present invention can be suitably used for producing molded articles in all fields such as an automobile field and electrical and electronic fields, requiring not only heat resistance and transparency but also heat discoloration resistance and moist heat resistance.

Specific examples of the molded article in the automobile field include lamp peripheral parts such as turn signal lamp lenses, high-mount stop lamp lenses, extension reflectors, and reflectors. Examples of the molded article in the electrical and electronic fields include lighting parts such as reflectors and covers of lighting equipment; and spring mechanism parts such as centering adjusters of optical disk drives such as CDs and BDs.

The molded article can be obtained by molding the polyarylate resin composition of the present invention into a desired shape by a commonly known melt molding method such as injection molding, compression molding, extrusion molding, transfer molding, or sheet molding.

In the polyarylate resin composition of the present invention, for example, yellow index (YIa) measured in a molded article with a thickness of 2 mm is preferably less than 10, more preferably less than 8, and further preferably less than 6. Further, in the molded article, yellow index (YIb) measured after heat treatment in a hot air dryer at 140° C. for 1000 h is preferably less than 22, more preferably less than 18, further preferably less than 14, and particularly preferably less than 10. In the present invention, as heat discoloration resistance of the polyarylate resin composition, yellow index difference (ΔYI) before and after the heat treatment in the hot air dryer at 140° C. for 1000 h is preferably 5 or less, more preferably 4 or less, further preferably 3 or less, and further preferably 2 or less.

Inherent viscosity of the polyarylate resin composition of the present invention is preferably 0.4 to 0.8 and more preferably 0.4 to 0.7, from the viewpoint of heat resistance, mechanical properties, and fluidity. Further, in the polyarylate resin composition, the inherent viscosity after moist heat treatment under conditions of 130° C. and 75% RH for 100 h is preferably not substantially reduced, and is preferably 0.4 to 0.8, and more preferably 0.4 to 0.7. In the present invention, as moist heat resistance of the polyarylate resin composition, the inherent viscosity retention rate before and after the moist heat treatment under conditions of 130° C. and 75% RH for 100 h is preferably 75% or more, more preferably 80% or more, further preferably 85% or more, particularly preferably 90% or more, and most preferably 92% or more. In the present invention, as moist heat resistance of the polyarylate resin composition, it is particularly preferable that the inherent viscosity retention rate before and after performing moist heat treatment under conditions of 140° C. and 75% RH for 50 h achieves the inherent viscosity retention rate before and after the moist heat treatment under conditions of 130° C. and 75% RH for 100 h described above.

EXAMPLES

1. Evaluation Method
(1) Inherent Viscosities of Polyarylate Resin and Polyarylate Resin Composition Polyarylate resin or polyarylate resin composition pellets were dissolved in 1,1,2,2-tetrachloroethane to prepare a sample solution with a concentration of 1 g/dL, and flow-down time t of the sample solution and flow-down time to of the solvent were measured at the temperature of 25° C. using an Ubbelohde viscometer, and inherent viscosity was calculated using the following formula. Note c=1 g/dL.

$$\eta inh=\{\ln(t/t_0)\}/c$$

(2) Deflection Temperature Under Load of Polyarylate Resin Composition

For each test piece, deflection temperature under load (T) was measured at a load of 1.8 MPa according to ISO75 standard, and determination was made according to the following criteria. For each test piece, a molded article (thickness 4 mm) obtained by injection molding under conditions of a cylinder temperature of 320 to 360° C. and a mold temperature of 100° C. was subjected to humidity control treatment (leaved at room temperature for 1 day or more), and then subjected to a test. It is practically preferable that the deflection temperature under load is 140° C. or more.
 S: 170° C.≤T (super excellent);
 A: 160° C.≤T<170° C. (excellent);
 B: 150° C.≤T<160° C. (good);
 C: 140° C.≤T<150° C. (no problem in practical use);
 D: T<140° C. (problematic in practical use).
(3) Total Light Transmittance of Polyarylate Resin Composition For each test piece, a haze meter (NDH2000 made by NIPPON DENSHOKU INDUSTRIES CO., LTD.) was used to measure total light transmittance with a light source D65/viewing angle of 2°. For each test piece, a molded article (thickness 2 mm) obtained by injection molding under conditions of a cylinder temperature of 320 to 360° C. and a mold temperature of 100° C. was subjected to humidity control treatment (leaved at room temperature for 1 day or more), and then subjected to a test. It is practically preferable that the total light transmittance (L) is 87% or more.
 S: 87%≤L (super excellent);
 A: 86%≤L<87% (excellent);
 B: 85%≤L<86% (good);
 C: 84%≤L<85% (no problem in practical use);
 D: L<84% (problematic in practical use).

(4) Heat Discoloration Resistance of Polyarylate Resin Composition

The molded article (thickness 2 mm) prepared in (3) was used as a test piece. Each test piece was heat-treated in a hot air dryer at 140° C. for 1000 h. Yellow index before heat treatment (YIa) and yellow index after heat treatment (YIb) were measured. The yellow index was measured using a spectrocolorimeter (SE6000 made by NIPPON DENSHOKU INDUSTRIES CO., LTD.) with a light source C/viewing angle of 2° transmitted light, and was determined according to the following criteria. Heat discoloration resistance is a property evaluated based on both "YIb" and "difference between YIa and YIb ($\Delta$YI)". The smaller values of "YIb" and "$\Delta$YI", the more preferable the heat discoloration resistance.
 <YIb Criteria>
 S: YIb<10 (super excellent);
 A: 10≤YIb<14 (excellent);
 B: 14≤YIb<18 (good);
 C: 18≤YIb<22 (no problem in practical use);
 D: 22≤YIb (problematic in practical use).
 <$\Delta$YI Criteria>
 S: $\Delta$YI≤2 (super excellent);
 A: 2≤$\Delta$YI≤3 (excellent);
 B: 3≤$\Delta$YI≤4 (good);
 C: 4≤$\Delta$YI≤5 (no problem in practical use);
 D: 5≤$\Delta$YI (problematic in practical use).
(5) Moist Heat Resistance of Polyarylate Resin Composition The molded article (thickness 2 mm) prepared in (3) was used as a test piece. Each test piece was subjected to moist heat treatment under conditions of 130° C. and 75% RH for 100 h (Conditions 1) and under conditions of 140° C. and 75% RH for 50 h (Conditions 2), and inherent viscosities ($\eta$inh) before and after the moist heat treatment were measured. The inherent viscosity before the moist heat treatment is defined as $\eta 0$, and the inherent viscosities after each moist heat treatment under Conditions 1 and 2 are defined as $\eta 1$ and $\eta 2$, respectively. Moist heat resistance is a property evaluated based on both "retention rate of $\eta 1$" and "retention rate of $\eta 2$". The larger values of "retention rate of $\eta 1$" and "retention rate of $\eta 2$", the more preferable the moist heat resistance.

The inherent viscosity followed the method in (1). From the inherent viscosities before and after the moist heat treatment, retention rate (R) was calculated by the following formula and determined according to the following criteria. The retention rate (R) is preferably 80% or more.

$$R\ (\%)=\{(\text{Inherent viscosity after moist heat treatment})/(\text{Inherent viscosity before moist heat treatment})\}\times 100$$

SS: 92%≤R (best);
 S: 90%≤R<92% (super excellent);
 A: 85%≤R<90% (excellent);
 B: 80%≤R<85% (good);
 C: 75%≤R<80% (no problem in practical use);
 D: R<75% (problematic in practical use).
(6) Comprehensive Evaluation Comprehensive evaluation was made based on six evaluation results of "heat resistance", "transparency", "heat discoloration resistance (YIb and $\Delta$YI)" and "moist heat resistance (retention rates of $\eta 1$ and $\eta 2$)".
 SS: All evaluation results were S or higher, and evaluation results of "retention rate of $\eta 1$" and "retention rate of $\eta 2$" regarding moist heat resistance were SS;
 S: Of all evaluation results, the lowest evaluation result was S;

A: Of all evaluation results, the lowest evaluation result was A;
B: Of all evaluation results, the lowest evaluation result was B;
C: Of all evaluation results, the lowest evaluation result was C;
D: Of all evaluation results, the lowest evaluation result was D.

2. Raw Materials
(1) Polyarylate Resin
  (α-1): U-powder (inherent viscosity 0.55) made by UNITIKA LTD. The polyarylate resin is a polyarylate of 2,2-bis(4-hydroxyphenyl)propane and terephthalic acid and isophthalic acid, and the blending ratio (molar ratio) of terephthalic acid and isophthalic acid is 50/50. Resin composition: 2,2-bis(4-hydroxyphenyl)propane/terephthalic acid/isophthalic acid=100/50/50 (mol %).
(2) Polycarbonate Resin
  (b-1): SD POLYCA200-13 (inherent viscosity 0.50) made by Sumika Polycarbonate Limited. The polycarbonate resin is a polycarbonate of 2,2-bis(4-hydroxyphenyl)propane and phosgene. Resin composition: 2,2-bis(4-hydroxyphenyl)propane/phosgene=100/100 (mol %).
(3) Silane Compounds
  (c-1): Dimethoxydiphenylsilane (KBM-202SS made by Shin-Etsu Chemical Co., Ltd.), boiling point 304° C. (this silane is a compound represented by the general formula (α-i)).
  (c-2): Phenyltrimethoxysilane (KBM-103 made by Shin-Etsu Chemical Co., Ltd.), boiling point 218° C. (this silane is a compound represented by the general formula (α-i)).
  (c-3): Phenyltriethoxysilane (KBE-103 made by Shin-Etsu Chemical Co., Ltd.), boiling point 236° C. (this silane is a compound represented by the general formula (α-i)).
  (c-4): Hexyltrimethoxysilane (KBM-3063 made by Shin-Etsu Chemical Co., Ltd.), boiling point 202° C. (this silane is a compound represented by the general formula (α-iii)).
  (c-5): Dimethylphenylsilane (reagent made by Tokyo Chemical Industry Co., Ltd.), boiling point 158° C.
(4) Phosphorus-Based Compounds
  (d-1): Tris(2,4-di-t-butylphenyl)phosphite (irgafos 168 made by BASF SE) (phosphorus atom content 4.8%)
  (d-2): Bis(2,6-di-t-butyl-4-methylphenyl)pentaerythritol diphosphite (Adeka Stab PEP-36 made by Adeka Corporation) (phosphorus atom content 9.8%)
  (d-3): Triphenylphosphine (HOKUKO TPP made by HOKKO CHEMICAL INDUSTRY CO., LTD.)
  (d-4): Tetrakis(2,4-di-t-butylphenyl)-4,4-biphenylylene-diphosphonite (Hostanox P-EPQ made by Clariant Japan K.K.)
(5) Other Ingredient
  (e-1): Polycarbodiimide compound (STABAXOL P400 made by Rhein Chemie)

Example 1

Polyarylate resin (α-1) (95 parts by mass), polycarbonate resin (b-1) (5 parts by mass) and silane compound (c-1) (0.05 parts by mass) were collectively mixed, and then the mixture was charged from a main hopper of a same direction twin-screw extruder (TEM-37BS type made by Toshiba Machine Co., Ltd.) and melt-kneaded at a barrel temperature of 320 to 360° C. It was taken into strands from a die, cooled and solidified in a water tank, cut with a pelletizer, and dried with hot air at 120° C. for 12 hours to obtain polyarylate resin composition pellets.

Using the obtained polyarylate resin composition pellets, molding was performed with an injection molding machine (EC-100 type made by Toshiba Machine Co., Ltd.) to obtain a molded article. Various evaluations were performed using the obtained molded article. The results are shown in Table 1.

Examples 2 to 17 and Comparative Examples 1 to 11

Polyarylate resin composition pellets were obtained in the same manner as in Example 1 except that composition ratios of the polyarylate resin compositions were changed. After obtaining molded articles using the obtained polyarylate resin compositions pellets, various evaluations were performed. The results are shown in Tables 1 to 3.

TABLE 1

| | | | | | Example | | | | | | |
|---|---|---|---|---|---|---|---|---|---|---|---|
| | | | | | 1 | 2 | 3 | 4 | 5 | 6 | 7 |
| Component A | Polyarylate resin | a-1 | Parts by mass | | 95 | 90 | 70 | 50 | 30 | 10 | 5 |
| Component B | Polycarbonate resin | b-1 | Parts by mass | | 5 | 10 | 30 | 50 | 70 | 90 | 95 |
| Component C | Silane compound | c-1 | Parts by mass | | 0.05 | 0.05 | 0.05 | 0.05 | 0.05 | 0.05 | 0.05 |
| | | c-2 | | | — | — | — | — | — | — | — |
| | | c-3 | | | — | — | — | — | — | — | — |
| | | c-4 | | | — | — | — | — | — | — | — |
| | | c-5 | | | — | — | — | — | — | — | — |
| Component D | Phosphorus-based compound | d-1 | Parts by mass | | — | — | — | — | — | — | — |
| | | d-2 | | | — | — | — | — | — | — | — |
| | | d-3 | | | — | — | — | — | — | — | — |
| | | d-4 | | | — | — | — | — | — | — | — |
| Heat resistance | Deflection temperature under load | | ° C. | | 178 | 175 | 169 | 161 | 155 | 146 | 141 |
| | | | Evaluation | | S | S | A | A | B | C | C |
| Transparency | Total light transmittance | | % | | 87 S | 87 S | 88 S | 88 S | 88 S | 88 S | 88 S |

TABLE 1-continued

| | | | Example | | | | | | |
|---|---|---|---|---|---|---|---|---|---|
| | | | 1 | 2 | 3 | 4 | 5 | 6 | 7 |
| Heat discoloration resistance | Yellow index | Initial YIa | 8 | 7 | 6 | 5 | 4 | 3 | 3 |
| | | After heat treatment YIb | 12 | 10 | 9 | 8 | 7 | 6 | 6 |
| | | Evaluation | A | A | S | S | S | S | S |
| | Color difference | $\Delta YI^{*1}$ | 4 | 3 | 3 | 3 | 3 | 3 | 3 |
| | | Evaluation | B | A | A | A | A | A | A |
| Moist heat resistance | Inherent viscosity η0 | Before moist heat treatment | 0.525 | 0.523 | 0.515 | 0.511 | 0.506 | 0.501 | 0.498 |
| | Inherent viscosity η1 (130° C., 75% RH, 100 h) | After moist heat treatment | 0.478 | 0.486 | 0.474 | 0.465 | 0.455 | 0.436 | 0.428 |
| | | Retention rate (%) | 91 | 93 | 92 | 91 | 90 | 87 | 86 |
| | | Evaluation | S | SS | SS | S | S | A | A |
| | Inherent viscosity η2 (140° C., 75% RH, 50 h) | After moist heat treatment | 0.431 | 0.450 | 0.433 | 0.419 | 0.409 | 0.376 | 0.374 |
| | | Retention rate (%) | 82 | 86 | 84 | 82 | 81 | 75 | 75 |
| | | Evaluation | B | A | B | B | B | C | C |
| Comprehensive evaluation | | | B | A | B | B | B | C | C |

$^{*1}\Delta YI = |YIb - YIa|$

TABLE 2

| | | | | Example | | | | | | | | | |
|---|---|---|---|---|---|---|---|---|---|---|---|---|---|
| | | | | 8 | 9 | 10 | 11 | 12 | 13 | 14 | 15 | 16 | 17 |
| Component A | Polyarylate resin | a-1 | Parts by mass | 90 | 90 | 90 | 90 | 90 | 90 | 90 | 90 | 90 | 90 |
| Component B | Polycarbonate resin | b-1 | Parts by mass | 10 | 10 | 10 | 10 | 10 | 10 | 10 | 10 | 10 | 10 |
| Component C | Silane compound | c-1 | Parts by mass | 0.005 | 2 | — | — | — | — | 0.025 | 0.05 | 0.05 | 0.05 |
| | | c-2 | | — | — | 0.05 | — | — | — | 0.025 | — | — | — |
| | | c-3 | | — | — | — | 0.05 | — | — | — | — | — | — |
| | | c-4 | | — | — | — | — | 0.05 | — | — | — | — | — |
| | | c-5 | | — | — | — | — | — | — | — | — | — | — |
| Component D | Phosphorus-based compound | d-1 | Parts by mass | — | — | — | — | — | — | 0.025 | — | — | — |
| | | d-2 | | — | — | — | — | — | — | — | 0.025 | — | — |
| | | d-3 | | — | — | — | — | — | — | — | — | 0.025 | — |
| | | d-4 | | — | — | — | — | — | — | — | — | — | 0.025 |
| Heat resistance | Deflection temperature under load | ° C. | | 176 | 172 | 174 | 175 | 174 | 175 | 175 | 175 | 175 | 175 |
| | | Evaluation | | S | S | S | S | S | S | S | S | S | S |
| Transparency | Total light transmittance | % | | 87 S | 87 S | 87 S | 87 S | 87 S | 87 S | 88 S | 87 S | 87 S | 87 S |
| Heat discoloration resistance | Yellow index | Initial YIa | | 7 | 7 | 7 | 7 | 7 | 7 | 6 | 6 | 6 | 6 |
| | | After heat treatment YIb | | 11 | 10 | 10 | 10 | 10 | 10 | 8 | 8 | 8 | 9 |
| | | Evaluation | | A | A | A | A | A | A | S | S | S | S |
| | Color difference | $\Delta YI^{*1}$ | | 4 | 3 | 3 | 3 | 3 | 3 | 2 | 2 | 2 | 3 |
| | | Evaluation | | B | A | A | A | A | A | S | S | S | A |
| Moist heat resistance | Inherent viscosity η0 | Before moist heat treatment | | 0.521 | 0.519 | 0.521 | 0.522 | 0.520 | 0.522 | 0.527 | 0.526 | 0.525 | 0.524 |
| | Inherent viscosity η1 (130° C., 75% RH, 100 h) | After moist heat treatment | | 0.427 | 0.467 | 0.474 | 0.480 | 0.468 | 0.480 | 0.490 | 0.484 | 0.483 | 0.477 |
| | | Retention rate (%) | | 82 | 90 | 91 | 92 | 90 | 92 | 93 | 92 | 92 | 91 |
| | | Evaluation | | B | S | S | SS | S | SS | SS | SS | SS | S |
| | Inherent viscosity η2 (140° C., 75% RH, | After moist heat treatment | | 0.391 | 0.415 | 0.427 | 0.438 | 0.416 | 0.438 | 0.485 | 0.473 | 0.467 | 0.445 |

TABLE 2-continued

|  |  |  | Example | | | | | | | | | |
|---|---|---|---|---|---|---|---|---|---|---|---|---|
|  |  |  | 8 | 9 | 10 | 11 | 12 | 13 | 14 | 15 | 16 | 17 |
| 50 h) | Retention rate (%) |  | 75 | 80 | 82 | 84 | 80 | 84 | 92 | 90 | 89 | 85 |
|  | Evaluation |  | C | B | B | B | B | B | SS | S | A | A |
| Comprehensive evaluation |  |  | C | B | B | B | B | B | SS | S | A | A |

*1 ΔYI = |YIb − YIa|

TABLE 3

|  |  |  |  | Comparative Example | | | | | | | | | | |
|---|---|---|---|---|---|---|---|---|---|---|---|---|---|---|
|  |  |  |  | 1 | 2 | 3 | 4 | 5 | 6 | 7 | 8 | 9 | 10 | 11 |
| Component A | Polyarylate resin | a-1 | Parts by mass | 100 | — | 90 | 90 | 70 | 50 | 30 | 90 | 90 | 90 | 90 |
| Component B | Polycarbonate resin | b-1 | Parts by mass | — | 100 | 10 | 10 | 30 | 50 | 70 | 10 | 10 | 10 | 10 |
| Component C | Silane compound | c-1 | Parts by mass | 0.05 | 0.05 | — | — | — | — | — | — | — | — | 8 |
|  |  | c-5 | mass | — | — | — | 0.05 | 0.05 | 0.05 | 0.05 | 0.05 | — | — | — |
| Component D | Phosphorus-based compound | d-1 | Parts by mass | — | — | — | — | — | — | — | 0.025 | 0.05 | 0.025 | — |
| Other ingredient | Carbodiimide | e-1 | Parts by mass | — | — | — | — | — | — | — | — | — | — | — |
| Heat resistance | Deflection temperature under load | ° C. | | 181 | 134 | 175 | 173 | 167 | 159 | 153 | 174 | 175 | 175 | 152 |
|  |  | Evaluation | | S | D | S | S | A | B | B | S | S | S | B |
| Transparency | Total light transmittance | % | | 87 S | 89 S | 87 S | 87 S | 87 S | 88 S | 88 S | 87 S | 85 B | 87 S | 87 S |
| Heat discoloration resistance | Yellow index | Initial YIa | | 9 | 2 | 7 | 8 | 7 | 6 | 5 | 7 | 11 | 7 | 7 |
|  |  | After heat treatment YIb | | 15 | 5 | 22 | 14 | 13 | 12 | 11 | 13 | 26 | 12 | 13 |
|  |  | Evaluation | | B | S | D | B | A | A | A | A | D | A | A |
|  | Color difference | ΔYI*1 | | 6 | 3 | 15 | 6 | 6 | 6 | 6 | 6 | 15 | 5 | 6 |
|  |  | Evaluation | | D | A | D | D | D | D | D | D | D | C | D |
| Moist heat resistance | Inherent viscosity η0 | Before moist heat treatment | | 0.527 | 0.496 | 0.520 | 0.519 | 0.511 | 0.507 | 0.502 | 0.523 | 0.524 | 0.523 | 0.501 |
|  | Inherent viscosity η1 (130° C., 75% RH, 100 h) | After moist heat treatment | | 0.300 | 0.327 | 0.208 | 0.384 | 0.378 | 0.370 | 0.361 | 0.382 | 0.456 | 0.194 | 0.410 |
|  |  | Retention rate (%) | | 57 | 66 | 40 | 74 | 74 | 73 | 72 | 73 | 87 | 37 | 82 |
|  |  | Evaluation | | D | D | D | D | D | D | D | D | A | D | B |
|  | Inherent viscosity η2 (140° C., 75% RH, 50 h) | After moist heat treatment | | 0.148 | 0.159 | 0.070 | 0.249 | 0.245 | 0.235 | 0.221 | 0.241 | 0.388 | 0.080 | 0.372 |
|  |  | Retention rate (%) | | 28 | 32 | 13 | 48 | 48 | 46 | 44 | 46 | 74 | 15 | 74 |
|  |  | Evaluation | | D | D | D | D | D | D | D | D | D | D | D |
| Comprehensive evaluation |  |  |  | D | D | D | D | D | D | D | D | D | D | D |

*1 ΔYI = |YIb − YIa|

The polyarylate resin compositions obtained in Examples 1 to 17 were excellent in heat resistance, transparency, heat discoloration resistance, and moist heat resistance. In particular, the polyarylate resin compositions obtained in Examples 14 to 17 were more excellent in heat resistance, heat discoloration resistance, and moist heat resistance because a phosphorus-based compound was added.

Since the polyarylate resin composition obtained in Comparative Example 1 did not contain a polycarbonate resin, it was inferior in heat discoloration resistance (especially ΔYI) and moist heat resistance (retention rates of η1 and η2).

Since the polyarylate resin composition obtained in Comparative Example 2 did not contain a polyarylate resin, it was inferior in heat resistance and moist heat resistance (retention rates of η1 and η2).

Since the polyarylate resin composition obtained in Comparative Example 3 did not contain a silane compound, it was inferior in heat discoloration resistance (YIb and ΔYI) and moist heat resistance (retention rates of η1 and η2).

Since the polyarylate resin compositions obtained in Comparative Examples 4 to 8 used a silane compound having a boiling point of less than 200° C., it was inferior in heat discoloration resistance (especially ΔYI) and moist heat resistance (retention rate of η1 and η2).

Since the polyarylate resin composition obtained in Comparative Example 9 used carbodiimide different from the silane compound, they were inferior in heat discoloration resistance (YIb and ΔYI) and moist heat resistance (especially a retention rate of η2).

Since the polyarylate resin composition obtained in Comparative Example 10 did not contain a silane compound, it was inferior in moist heat resistance (retention rates of η1 and η2).

Since the polyarylate resin composition obtained in Comparative Example 11 contained the silane compound too much, it was inferior in heat discoloration resistance (especially ΔYI) and moist heat resistance (especially a retention rate of 12).

INDUSTRIAL APPLICABILITY

The polyarylate resin composition of the present invention is useful for producing a molded article in all fields such as an automobile field and electrical and electronic fields.

The invention claimed is:

1. A polyarylate resin composition; comprising 0.005~5 parts by mass of a silane compound (C) with a boiling point of 200° C. or more which is represented by the following general formula (α), based on 100 parts by mass of the total of a polyarylate resin (A) and a polycarbonate resin (B), a content ratio of the polyarylate resin (A) and the polycarbonate resin (B) being 5/95 to 95/5 (mass ratio), wherein the polyarylate resin composition does not comprise a polycarbodiimide compound,

[Chemical 1]

$$[R^1]_{n1} \cdot [R^{21}]_{n2} \cdot [R^{22}]_{4-n1-n2} \cdot Si \qquad (\alpha)$$

in which $R^1$ is an aryl group; $R^{21}$ is an alkoxy group having the number of carbon atoms 1~10; $R^{22}$ is a hydrogen atom or an alkyl group having the number of carbon atoms 1~10; n1 is an integer of 1 to 4, n2 is an integer of 0 to 3 and the sum of n1 and n2 is an integer of 1 to 4.

2. A polyarylate resin composition of claim 1, further comprising a phosphorus-based compound (D).

3. A polyarylate resin composition of claim 2, wherein a content of the phosphorus-based compound (D) is 0.01 to 1 parts by mass based on 100 parts by mass of the total of the polyarylate resin (A) and the polycarbonate resin (B).

4. A polyarylate resin composition of claim 2, wherein the phosphorus-based compound (D) is selected from phosphite compounds, tertiary phosphines, phosphonite compounds.

5. A molded article, being obtained from the polyarylate resin composition of claim 1.

6. A molded article of claim 5, wherein the molded article is a lamp peripheral part.

* * * * *